(12) United States Patent
Muroya et al.

(10) Patent No.: US 11,742,524 B2
(45) Date of Patent: Aug. 29, 2023

(54) SECONDARY BATTERY

(71) Applicant: SANYO Electric Co., Ltd., Daito (JP)

(72) Inventors: Yohei Muroya, Hyogo (JP); Hiroshi Takabayashi, Hyogo (JP); Tomokazu Yamanaka, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 16/733,631

(22) Filed: Jan. 3, 2020

(65) Prior Publication Data

US 2020/0274189 A1 Aug. 27, 2020

(30) Foreign Application Priority Data

Feb. 21, 2019 (JP) ................................. 2019-028970

(51) Int. Cl.
*H01M 10/058* (2010.01)
*H01M 50/531* (2021.01)
*H01M 50/567* (2021.01)
*H01M 50/566* (2021.01)
*H01M 10/04* (2006.01)
(Continued)

(52) U.S. Cl.
CPC ...... *H01M 10/058* (2013.01); *H01M 10/0413* (2013.01); *H01M 10/0468* (2013.01); *H01M 50/531* (2021.01); *H01M 50/566* (2021.01); *H01M 50/567* (2021.01); *H01M 50/55* (2021.01); *H01M 50/553* (2021.01); *H01M 50/562* (2021.01)

(58) Field of Classification Search
CPC ...... H01M 50/52; H01M 50/53; H01M 50/54; H01M 50/56; H01M 2/22; H01M 2/26; H01M 2/30; H01M 2/06; H01M 2/20; H01M 10/058
See application file for complete search history.

(56) References Cited

U.S. PATENT DOCUMENTS

2011/0076552 A1 3/2011 Taniguchi et al.
2014/0242439 A1* 8/2014 Hattori ................ H01M 50/172
429/121
(Continued)

FOREIGN PATENT DOCUMENTS

JP 2011-76867 A 4/2011
JP 2013-225500 A 10/2013
(Continued)

OTHER PUBLICATIONS

Layosa, Carlicia. "Swaging: A Deformation: MISUMI Blog." MISUMI Blog | Configured to Save Time, Misumi, Mar. 7, 2018, us.misumi-ec.com/blog/swaging-a-deformation/. (Year: 2018).*
(Continued)

*Primary Examiner* — Niki Bakhtiari
*Assistant Examiner* — Grace Ann Kenlaw
(74) *Attorney, Agent, or Firm* — WHDA, LLP

(57) ABSTRACT

A positive electrode terminal is inserted into a current-collector through hole formed, in a positive electrode current collector and riveted in a spot-faced hole formed in the positive electrode current collector. A protrusion is formed on a bottom surface of the spot-faced hole so as to extend around the current-collector through hole, and a riveted portion of the positive electrode terminal covers the protrusion. The riveted portion of the positive electrode terminal is weld-connected to an edge of the spot-faced hole.

3 Claims, 9 Drawing Sheets

(51) Int. Cl.
  *H01M 50/562* (2021.01)
  *H01M 50/55* (2021.01)
  *H01M 50/553* (2021.01)

(56) References Cited

U.S. PATENT DOCUMENTS

2014/0242440 A1* 8/2014 Yamada .............. H01M 50/543
                                                    429/121
2016/0372722 A1   12/2016 Yoshida et al.
2017/0149043 A1*  5/2017 Koo .................... H01M 50/172

FOREIGN PATENT DOCUMENTS

JP    2014-167846 A    9/2014
JP    2017-010743 A    1/2017

OTHER PUBLICATIONS

"COVER: Definition of COVER by Oxford Dictionary on Lexico. com Also Meaning of COVER." Lexico Dictionaries | English, Lexico Dictionaries, May 12, 2021, www.lexico.com/en/definition/cover. (Year: 2021).*

* cited by examiner

SECONDARY BATTERY

CROSS REFERENCE TO RELATED APPLICATIONS

The present invention application claims priority to Japanese Patent Application No. 2019-028970 filed in the Japan Patent Office on Feb. 1, 2019, the entire contents of which are incorporated herein by reference.

BACKGROUND OF THE INVENTION

Field of the Invention

The present disclosure relates to a secondary battery.

Description of Related Art

Alkaline secondary batteries and non-aqueous electrolyte secondary batteries have been used in drive power sources of electric vehicles (EV) and hybrid electric vehicles (HEV, PHEV).

In each of these secondary batteries, a metal exterior body that has an opening and a sealing plate that seals the opening form a battery case. In the battery case, an electrode body that includes a positive electrode plate, a negative electrode plate, and a separator is accommodated together with an electrolyte. A positive electrode terminal and a negative electrode terminal are joined to the sealing plate. The positive electrode terminal is electrically connected to the positive electrode plate via a positive electrode current collector, and the negative electrode terminal is electrically connected to the negative electrode plate via a negative electrode current collector.

An example of a method for connecting a terminal and a current collector to each other is to form a through hole in the current collector, insert a portion of the terminal on one end side thereof into the through hole, and rivet the end of the portion of the terminal onto the current collector.

For example, Japanese Published Unexamined Patent Application No. 2011-76867 (Patent Document 1) discloses that a spot-faced hole is formed around a through hole of a current collector, the diameter of an end portion of a terminal is increased in the spot-faced hole, and the portion of the terminal that has the increased diameter is weld-connected to the edge of the spot-faced hole.

In a secondary battery in which a terminal is riveted in a spot-faced hole formed in a current collector, a large gap may sometimes be formed between the riveted portion of the terminal and the current collector depending on conditions for riveting the terminal. If such a large gap is formed, there is a possibility that the connection between the terminal and the current collector will become unstable.

FIG. 15 illustrates a case in which a terminal 507 is inserted into a current-collector through hole 506c formed in a base portion 506a of a current collector and in which the terminal 507 is riveted onto the base portion 506a. As illustrated in FIG. 15, there is a possibility that a large gap 90 will be formed between a riveted portion 507x of the terminal 507 and the bottom surface of the spot-faced hole 506d formed in the base portion 506a of the current collector. In addition, there is a possibility that a large gap 91 will be formed between the riveted portion 507x of the terminal 507 and a side surface of the spot-faced hole 506d formed in the base portion 506a of the current collector. The presence of the gap 90 or the gap 91 may sometimes reduce the reliability of a connection portion in which the terminal and the current collector are connected to each other. Note that, in the case where the length of the riveted portion 507x of the terminal 507 is increased in such a manner that the large gap 91 will not be formed between the riveted portion 507x of the terminal 507 and the side surface of the spot-faced hole 506d, the large gap 90 is likely to be formed between the riveted portion 507x of the terminal 507 and the bottom surface of the spot-faced hole 506d. In particular, the gap 90 is likely to be formed when the terminal 507 is riveted and fixed onto the current collector by a single riveting operation.

It is an object of the present disclosure to provide a secondary battery having improved reliability of a connection portion in which a terminal and a current collector are connected to each other.

BRIEF SUMMARY OF THE INVENTION

A secondary battery according to a first aspect of the present disclosure includes an electrode body that includes a positive electrode plate and a negative electrode plate, an exterior body that has an opening and accommodates the electrode body, a sealing plate that has a terminal mounting hole and seals the opening, a current collector that is electrically connected to the positive electrode plate or the negative electrode plate, and a terminal that is connected to the current collector and inserted in the terminal mounting hole. The current collector has a current-collector through hole. A spot-faced hole is formed around the current-collector through hole. The spot-faced hole has a bottom surface and a side surface. The terminal is inserted in the current-collector through hole and riveted in the spot-freed hole. A protrusion is formed on the bottom surface in such a manner as to extend around the current-collector through hole. A riveted portion of the terminal covers the protrusion. The riveted portion of the terminal is weld-connected to an edge of the spot-faced hole.

In the secondary battery according to the first aspect of the present disclosure, formation of a large gap between the riveted portion of the terminal and the bottom surface of the spot-faced hole and formation of a large gap between the riveted portion of the terminal and the side surface of the spot-faced hole can be effectively suppressed. Thus, the secondary battery has a high reliability of the connection portion in which the terminal and the current collector are connected to each other. Note that, by riveting the terminal in the spot-faced hole, the riveted terminal is deformed so as to be in contact with both the bottom surface and the side surface of the spot-faced hole, and it is less likely that a gap will be formed between the riveted portion of the terminal and the current collector. In addition, by weld-connecting the riveted portion of the terminal to the edge of the spot-faced hole, the terminal and the current collector are further strongly connected to each other.

A secondary battery according to a second aspect of the present disclosure includes an electrode body that includes a positive electrode plate and a negative electrode plate, an exterior body that has an opening and accommodates the electrode body, a sealing plate that has a terminal mounting hole and seals the opening, a current collector that is electrically connected to the positive electrode plate or the negative electrode plate, and a terminal that is connected to the current collector and inserted in the terminal mounting hole. The current collector has a current-collector through hole. A spot-faced hole is formed around the current-collector through hole. The spot-faced hole has a bottom surface and a side surface. The terminal is inserted in the current-collector through whole and riveted in the spot-faced hole. The bottom surface is inclined with respect to a radial direction of the current-collector through hole in such a manner that a depth of the spot-freed hole gradually increases in a direction from the current-collector through hole toward the side surface. A riveted portion of the terminal is weld-connected to an edge of the spot-faced hole.

In the secondary battery according to the second aspect of the present disclosure, formation of a large gap between the riveted portion of the terminal and the bottom surface of the spot-faced hole and formation of a large gap between the riveted portion of the terminal and the side surface of the spot-faced hole can be effectively suppressed.

According to the present disclosure, a secondary battery having improved reliability of a connection portion in which a terminal and a current collector are connected to each other can be provided.

DETAILED DESCRIPTION OF THE INVENTION

A quadrangular secondary battery will be described below with reference to the drawings as a secondary battery according to an embodiment of the present disclosure. Note that the scope of the present disclosure is not limited to the following embodiment, and changes may be arbitrarily made within the technical concept of the present invention.

Figure 1:
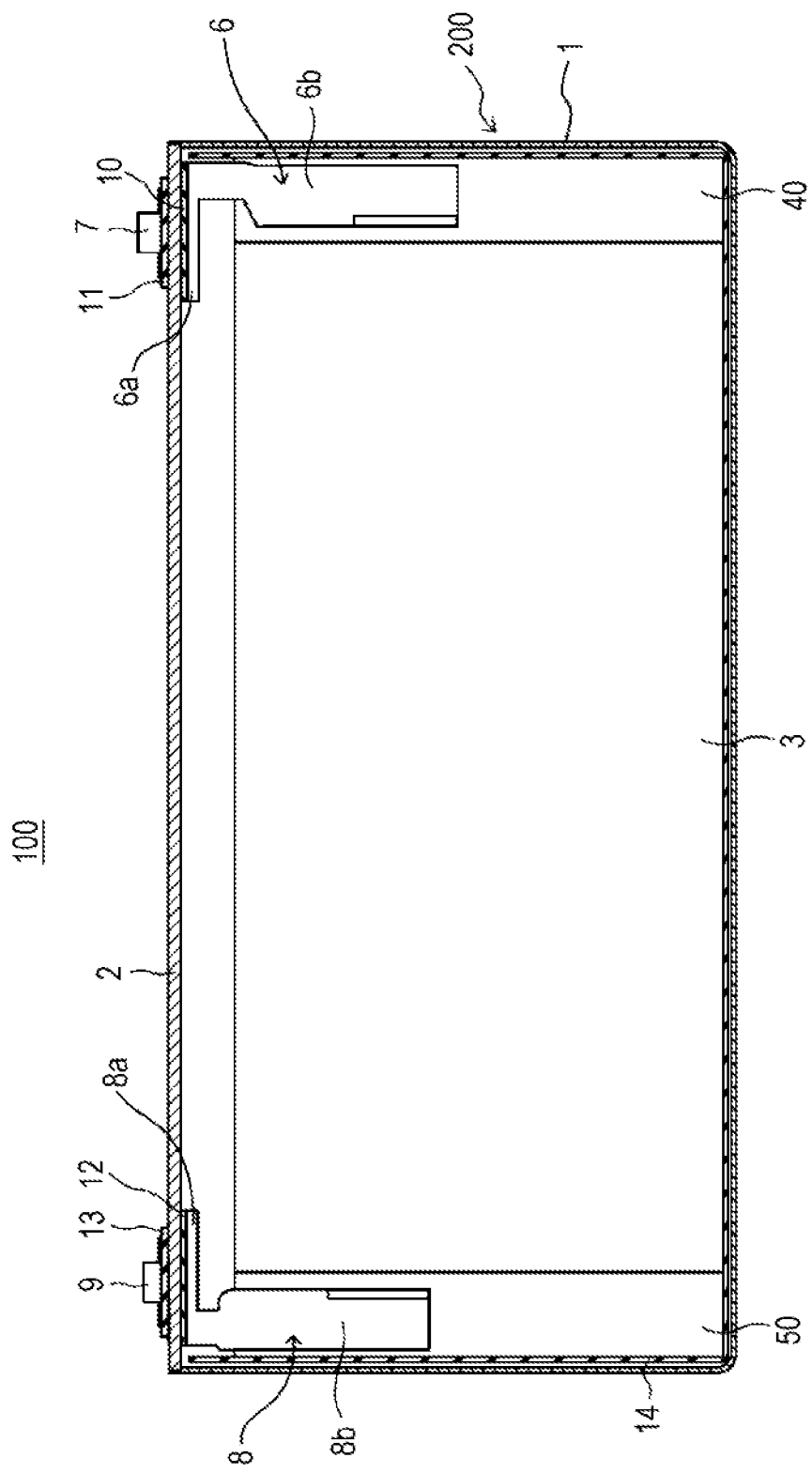
FIG. 1 is a diagram illustrating a quadrangular secondary battery according to an embodiment of the present disclosure by removing a front side wall of a quadrangular exterior body and a front part of an electrode-body holder.
Figure 2:
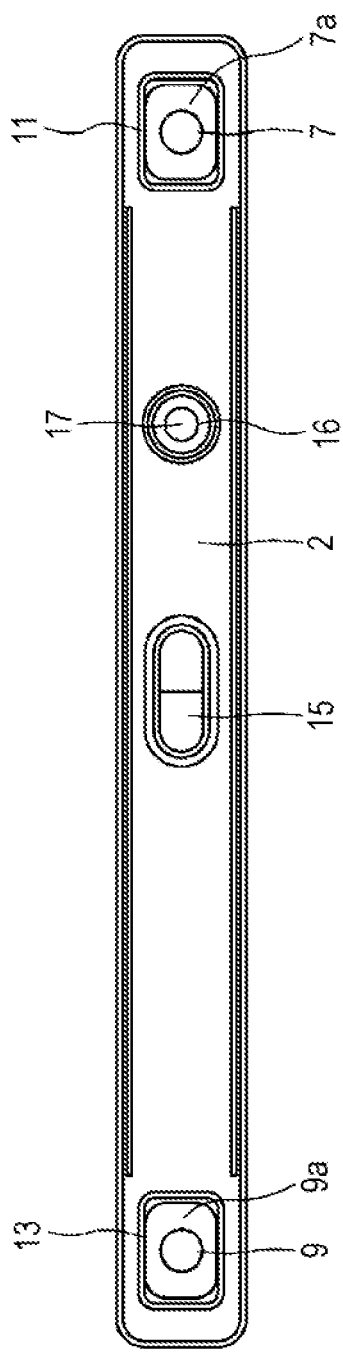
FIG. 2 is a top view of the quadrangular secondary battery according to the embodiment.

First, the configuration of a quadrangular secondary battery 100 according to the embodiment will be described. As illustrated in FIG. 1 and FIG. 2, the quadrangular secondary battery 100 includes a quadrangular exterior body 1 that has an opening formed in an upper portion thereof and a sealing plate 2 that seals the opening. The quadrangular exterior body 1 and the sealing plate 2 form a battery case 200. The quadrangular exterior body 1 and the sealing plate 2 are each made of a metal and preferably made of, for example, aluminum or arm aluminum alloy. In the quadrangular exterior body 1, a flat wound electrode body 3 including a belt-shaped positive electrode plate and a belt-shaped negative electrode plate that are wound with a belt-shaped separator interposed therebetween is accommodated together with a non-aqueous electrolyte (not illustrated). An insulating sheet 14 that is made of a resin is disposed between the quadrangular exterior body 1 and the electrode body 3. The sealing plate 2 is provided with a gas exhaust valve 15 that breaks when the pressure in the battery ease 200 becomes equal to or greater than a predetermined value in such a manner that the gas in the battery case 200 is exhausted to the outside of the battery case 200. In addition, an electrolyte injection hole 16 that is formed in the sealing plate 2 is sealed with a sealing member 17.

Figure 3A:
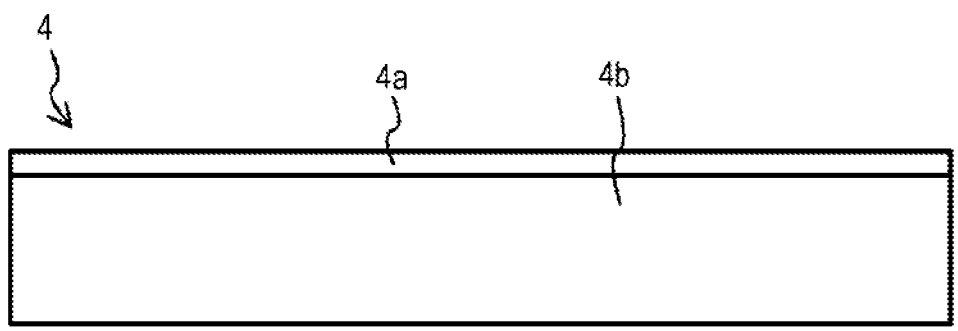
FIGS. 3A and 3B are respectively a plan view of a positive electrode plate according to the embodiment and a plan view of a negative electrode plate according to the embodiment.

As illustrated in FIG. 3A, a positive electrode plate 4 includes a metallic positive electrode core body 4a and a positive electrode active material layer 4b that is formed on the two surfaces of the positive electrode core body 4a. The positive electrode plate 4 has a positive-electrode-core-body exposed portion that is formed at a widthwise end of thereof so as to extend in the longitudinal direction of the positive electrode plate 4. In the positive-electrode-core-body exposed portion, the positive electrode active material layer 4b is not formed on the two surfaces of the positive electrode core body 4a. It is preferable that the positive electrode core body 4a be made of aluminum or an aluminum alloy. The positive electrode active material layer 4b includes a positive electrode active material. For example, a lithium transition metal composite oxide or the like can be used as the positive electrode active material. In addition, it is preferable that the positive electrode active material layer 4b include a binder and an electrically conductive material. A resin binder is preferably used as the binder, and for example, a polyvinylidene fluoride or the like can be used. A carbon material such as carbon black is preferably used as the electrically conductive material.

Figure 3B:
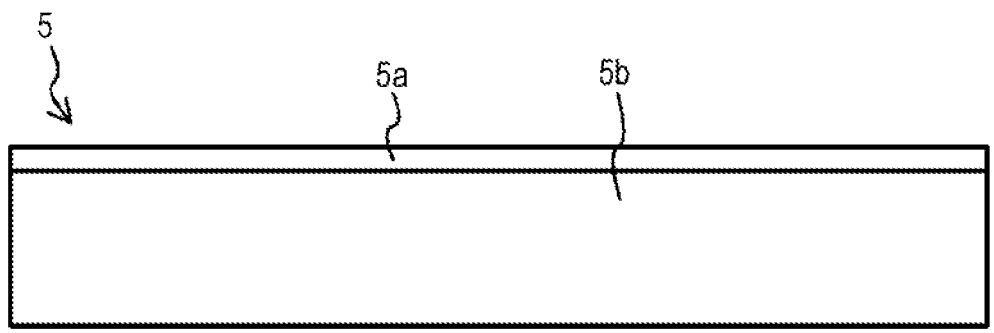

As illustrated in FIG. 3B, a negative electrode plate 5 includes a metallic negative electrode core body 5a and a negative electrode active material layer 5b that is formed on the two surfaces of the negative electrode core body 5a. The negative electrode plate 5 has a negative-electrode-core-body exposed portion that is formed at a widthwise end of thereof so as to extend in the longitudinal direction of the negative electrode plate 5. In the negative-electrode-core-body exposed portion, the negative electrode active material layer 5b is not formed on the two surfaces of the negative electrode core body 5a. It is preferable that the negative electrode core body 5a be made of copper or a copper alloy. The negative electrode active material layer 5b includes a negative electrode active material. As the negative electrode active material, for example, a carbon material such as graphite or amorphous carbon, a silicon material such as silicon or silicon oxide, or the like can be used. It is preferable that the negative electrode active material layer 5b include a binder. A resin binder is preferably used as the binder, and it is preferable that the binder include, for example, styrene-butadiene rubber (SBR) and carboxymethyl cellulose (CMC) The negative electrode active material layer 5b may include an electrically conductive material as necessary.

The wound electrode body 3 includes the positive-electrode-core-body exposed portion that is wound at one end thereof and the negative-electrode-core-body exposed portion that is wound at the other end thereof. The wound positive-electrode-core-body exposed portion forms a positive-electrode-core-body layered portion 40 that is formed by winding the positive electrode core body 4a in layers. The wound negative-electrode-core-body exposed portion forms a negative-electrode-core-body layered portion 50 that is formed by winding the negative electrode core body 5a in layers.

A positive electrode current collector 6 is connected to the positive-electrode-core-body layered portion 40. The positive electrode current collector 6 is connected to a positive electrode terminal 7 that is joined to the sealing plate 2. An internal insulating member 10 that is made of a resin is disposed between the sealing plate 2 and the positive electrode current collector 6. An external insulating member 11 that is made of a resin is disposed between the sealing plate 2 and the positive electrode terminal 7. The positive electrode current collector 6 and the positive electrode terminal 7 are electrically insulated from the sealing plate 2 by the internal insulating member 10 and the external insulating member 11. The positive electrode current collector 6 and the positive electrode terminal 7 are each lade of a metal or metallic material and preferably made of, for example, aluminum or an aluminum alloy.

A negative electrode current collector 8 is connected to the negative-electrode-core-body layered portion 50. The negative electrode current collector 8 is connected to a negative electrode terminal 9 that is joined to the sealing plate 2. An internal insulating member 12 that is made of a resin is disposed between the sealing plate 2 and the negative electrode current collector 8. An external insulating member 13 that is made of a resin is disposed between the sealing plate 2 and the negative electrode terminal 9. The negative electrode current collector 8 and the negative electrode terminal 9 are electrically insulated from the sealing plate 2 by the internal insulating member 12 and the external insulating member 13. The negative electrode current collector 8 and the negative electrode terminal 9 are each made of a metal or metallic material and preferably made of, for example, copper or a copper alloy. In addition, it is preferable that the negative electrode terminal 9 have a portion made of copper or a copper alloy and a portion made of aluminum or an aluminum alloy. Furthermore, it is preferable that the portion made of copper or a copper alloy be connected to the negative electrode current collector 8 made of copper or a copper alloy and that the portion made of aluminum or an aluminum alloy be exposed to the outside of the sealing plate 2.

The positive electrode terminal 7 has a flange portion 7a that is located further toward the outside of the quadrangular secondary battery 100 than the sealing plate 2 is and an inserting portion 7b that is formed on a surface of the flange portion 7a. The inserting portion 7b is connected to the positive electrode current collector 6 by passing through a terminal mounting hole formed in the sealing plate 2.

The negative electrode terminal 9 has a flange portion 9a that is located further toward the outside of the quadrangular secondary battery 100 than the sealing plate 2 is and an inserting portion (not illustrated) that is formed on a surface of the flange portion 9a. The inserting portion is connected to the negative electrode current collector 8 by passing through a terminal mounting hole (not illustrated) formed in the sealing plate 2.

The positive electrode current collector 6 has a base portion 6a that is positioned between the sealing plate 2 and the electrode body 3 and a lead portion 6b that extends from an end of the base portion 6a toward the electrode body 3. The positive electrode terminal 7 is connected to the base portion 6a, The lead portion 6b is joined to the positive-electrode-core-body layered portion 40.

The negative electrode current collector 8 has a base portion 8a that is positioned between the sealing plate 2 and the electrode body 3 and a lead portion 8b that extends from an end of the base portion 8a toward the electrode body 3. The negative electrode terminal 9 is connected to the base portion 8a. The lead portion 8b is joined to the negative-electrode-core-body layered portion 50.

[Mounting of Components Onto Sealing Plate]

A method of mounting the positive electrode current collector 6, the positive electrode terminal 7, the negative electrode current collector 8, and the negative electrode terminal 9 onto the sealing plate 2 will be described below.

Figure 4:
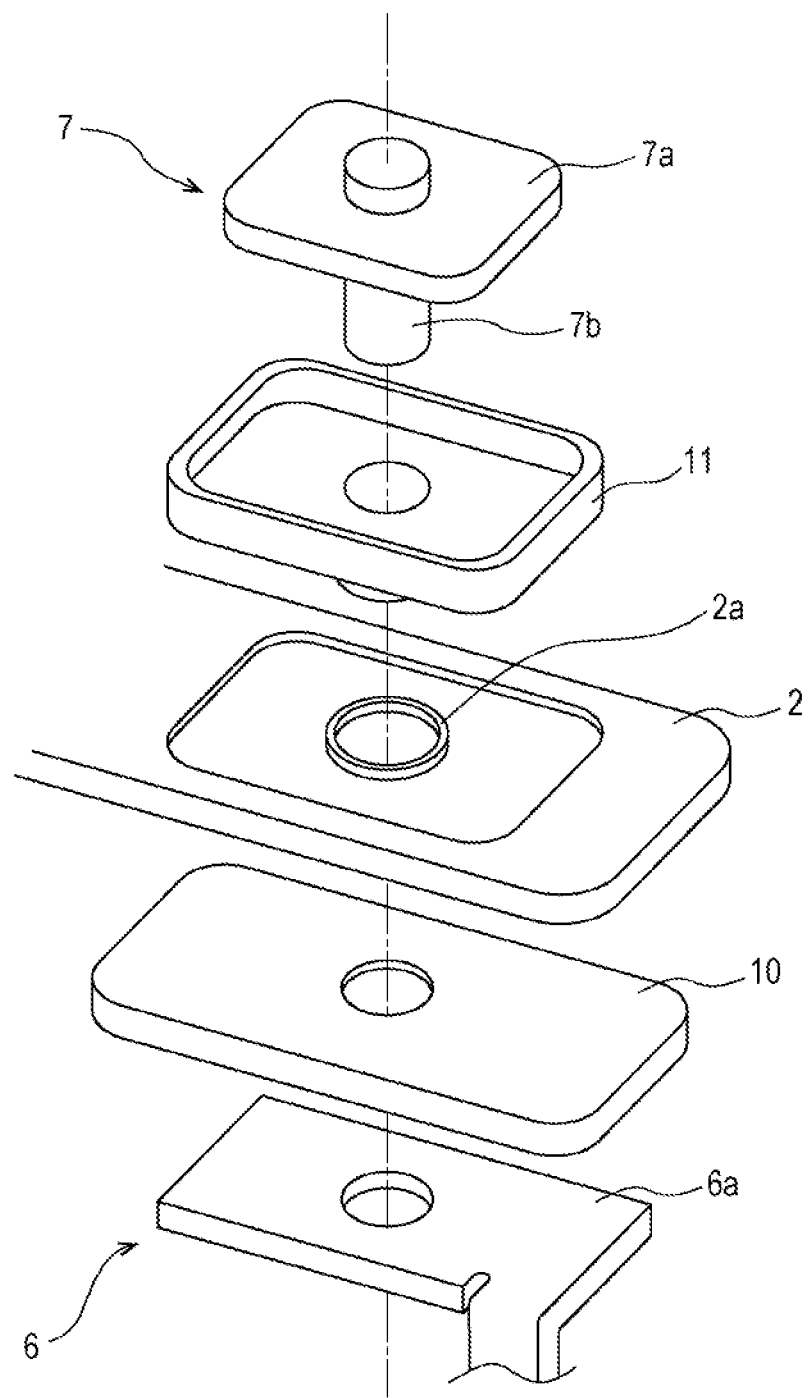
FIG. 4 is a perspective view illustrating a positive electrode terminal, an external insulating member, a sealing plate, an internal insulating member, and a positive electrode current collector before they are assembled.

FIG. 4 is a perspective view illustrating the positive electrode terminal 7, the external insulating member 11, the sealing plate 2, the internal insulating member 10, and the base portion 6a of the positive electrode current collector 6.

The external insulating member 11 is disposed on the sealing plate 2 so as to be located in the vicinity of a terminal mounting hole 2a, which is formed in the sealing plate 2, and so as to be located on the outside of the quadrangular secondary battery 100. The internal insulating member 10 and the base portion 6a of the positive electrode current collector 6 are disposed on the inner surface of the sealing plate 2 so as to be located in the vicinity of the terminal mounting hole 2a. Then, the inserting portion 7b of the positive electrode terminal 7 is inserted, from the outside of the quadrangular secondary battery 100, into a through hole of the external insulating member 11, the terminal mounting hole 2a of the sealing plate 2, a through hole of the internal insulating member 10, and a current-collector through hole 6c of the base portion 6a, and an end of the inserting portion 7b of the positive electrode terminal 7 is riveted onto the base portion 6a. As a result, the positive electrode terminal 7, the external insulating member 11, the sealing plate 2, the internal insulating member 10 and the positive electrode current collector 6 are integrally fixed in place. Note that the riveted portion, which is the end portion of the positive electrode terminal 7, may be welded to the base portion 6a.

Similarly, the external insulating member 13 is disposed on the sealing plate 2 so as to be located in the vicinity of another terminal mounting hole (not illustrated) formed hr the sealing plate 2 and so as to be located on the outside of the quadrangular secondary battery 100. The internal insulating member 12 and the base portion 8a of the negative electrode current collector 6 are disposed on the sealing plate 2 so as to be located in the vicinity of this terminal mounting hole and so as to be located inside the quadrangular secondary battery 100. Then, the negative electrode terminal 9 is inserted, from the outside of the quadrangular secondary battery 100, into a through hole of the external insulating member 13, the terminal mounting hole of the sealing, plate 2, a through hole of the internal insulating member 12, and a through hole of the base portion 8a, and an end portion of the negative electrode terminal 9 is riveted onto the base portion 8a. As a result, the negative electrode terminal 9, the external insulating member 13, the sealing plate 2, the internal insulating member 12, and the negative electrode current collector 8 are integrally fixed in place. Note that the riveted portion, which is the end portion of the negative electrode terminal 9, may be welded to the base portion 8a.

[Assembly of Quadrangular Secondary Battery 100]

The positive electrode current collector 6, which has been joined to the sealing plate 2, and the positive-electrode-core-body-layered portion 40 are joined to each other, and the negative electrode current collector 8, which has been joined to the sealing plate 2, and the negative-electrode-core-body layered portion 50 are joined to each other. Then, the electrode body 3 is covered with the insulating sheet 14, and the electrode body 3 covered with the insulating sheet 14 is inserted into the quadrangular exterior body 1. Subsequently, the sealing plate 2 is welded to the quadrangular exterior body 1 by laser welding in such a manner that the opening of the quadrangular exterior body 1 is sealed by the sealing plate 2. A non-aqueous electrolyte is injected into the battery case 200 through the electrolyte injection hole 16 of the sealing plate 2, after which the electrolyte injection hole 16 is sealed with the sealing member 17. As a result, the quadrangular secondary battery 100 is formed.

[Connection Portion of Terminal and Current Collector]

A detailed configuration of a connection portion which a terminal and a current collector are connected to each other will now be described by taking the positive electrode side as an example. The negative electrode side can have a similar configuration.

Figure 5:
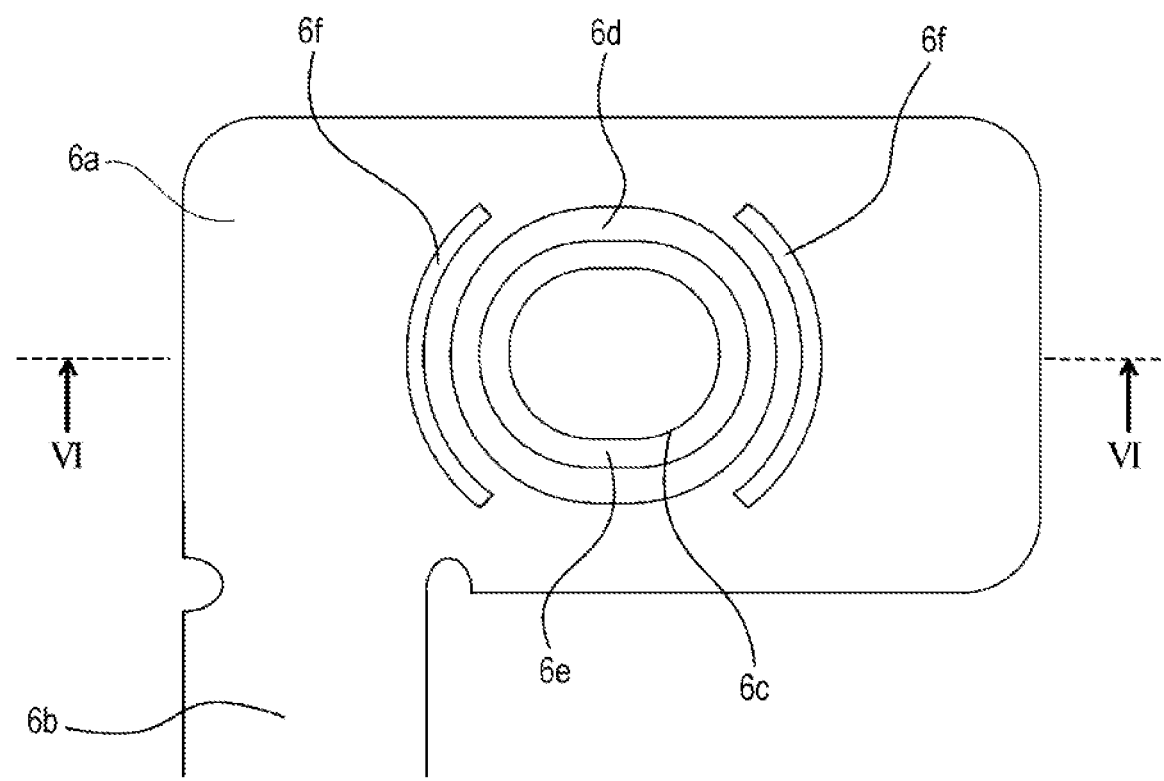
FIG. 5 is a diagram illustrating a surface of the positive electrode current collector according to the present disclosure, the surface facing an electrode body.
Figure 6:
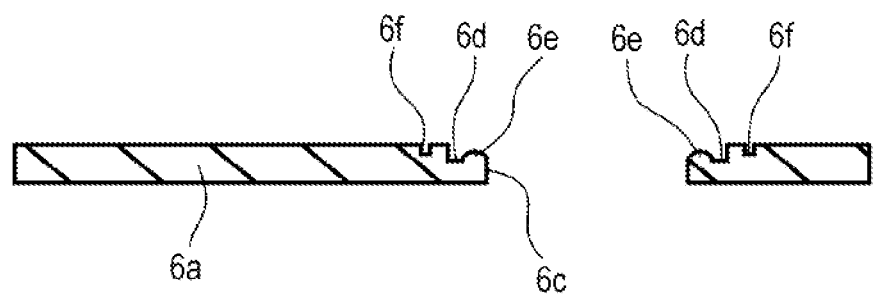
FIG. 6 is a sectional view taken along line VI-VI of FIG. 5.
Figure 9A:
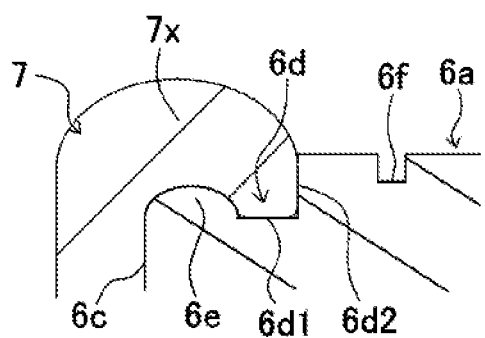
FIGS. 9A and 9B are respectively an enlarged view of the state of the vicinity of an area IX in FIG. 8 before laser welding is performed and an enlarged view of the state of the vicinity of the area IX in FIG. 8 after laser welding has been performed.

FIG. 5 is a diagram illustrating a surface of the base portion 6a of the positive electrode current collector 6, the surface facing the electrode body 3. FIG. 6 is a sectional view taken along line VI-VI of FIG. 5. As illustrated in FIG. 5 and FIG. 6, the base portion 6a of the positive electrode current collector 6 has the current-collector through hole 6c into which the inserting portion 7b of the positive electrode terminal 7 is inserted. A spot-faced hole 6d is formed around the current-collector through hole 6c. Note that, as illustrated in FIG. 9A, the spot-faced hole 6d is a recess having a bottom surface 6d1 and a side surface 6d2. Note that, the upward direction in FIG. 9A is a direction toward the electrode body 3.

A protrusion 6e is formed on the bottom surface 6d1 of the spot-faced hole 6d so as to extend along the circumferential edge of the current-collector through hole 6c. It is preferable that the protrusion 6e have a ring-like shape when viewed in plan view. However, the protrusion 6e does not need to have a ring-like shape and may have a partially cut-away ring-like shape when viewed in plan view. For example, a plurality of protrusions 6e each having an arc shape in plan view may be formed. It is preferable that the protrusion 6e have a linear shape when viewed in plan view. In addition, the surface of the protrusion 6e can be a curved surface.

It is preferable to form arc-shaped grooves 6f around the spot-faced hole 6d. By forming the grooves 6f, the shape of the side surface 6d2 of the spot-faced hole 6d becomes stable. It is preferable that the spot-faced hole 6d and the grooves 6f be simultaneously formed by press-working using a die having projections and depressions that correspond to the shapes of the spot-faced hole 6d and the grooves 6f. As a result, a metal that is present around an edge of the spot-faced hole 6d can be prevented from flowing to the outer periphery side, so that increase in the radius of curvature of a corner that is formed at the edge of the spot-faced hole 6d can be prevented with certainty. Note that the grooves 6f are not essential and may not be formed.

Figure 7:
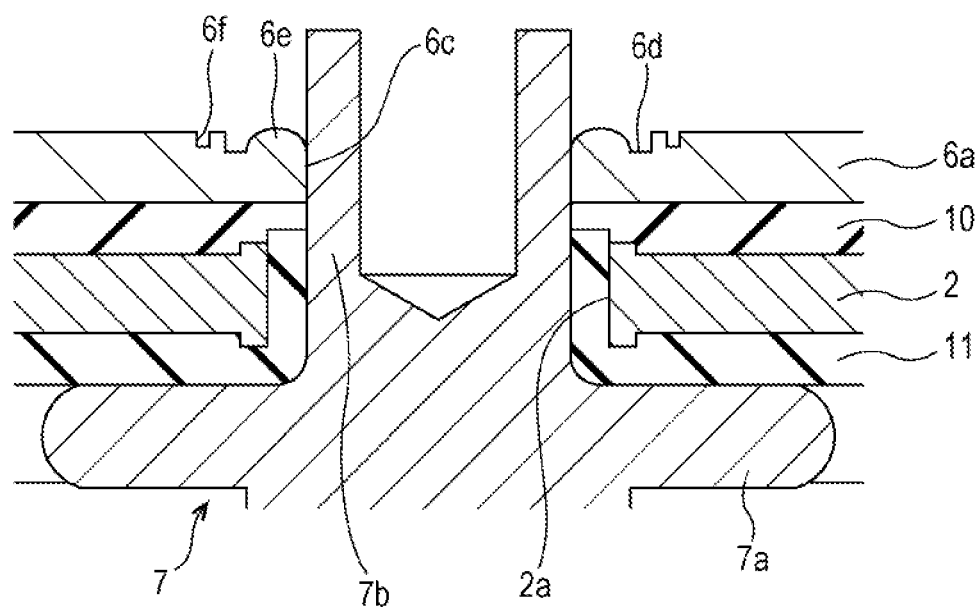
FIG. 7 is a sectional view of the vicinity of the positive electrode terminal taken along the longitudinal direction of the sealing plate and is a sectional view illustrating a state after the positive electrode terminal has been inserted in a through hole of the external insulating member, a terminal mounting hole of the sealing plate, a through hole of the internal insulating member, and a current-collector through hole of the positive electrode current collector.

FIG. 7 is a sectional view illustrating a state after the inserting portion 7b of the positive electrode terminal 7 has been inserted in the through hole of the external insulating member 11, the terminal mounting hole 2a of the sealing plate 2, the through hole of the internal insulating member 10, and the current-collector through hole 6c of the base portion 6a of the positive electrode current collector 6. FIG. 7 is a diagram illustrating a state before the inserting portion 7b of the positive electrode terminal 7 is riveted. FIG. 7 illustrates the cross section passing through the center of the current-collector through hole 6c and is a sectional view taken along the longitudinal direction of the sealing plate 2. The upward direction in FIG. 7 is a direction toward the electrode body 3.

Figure 8:
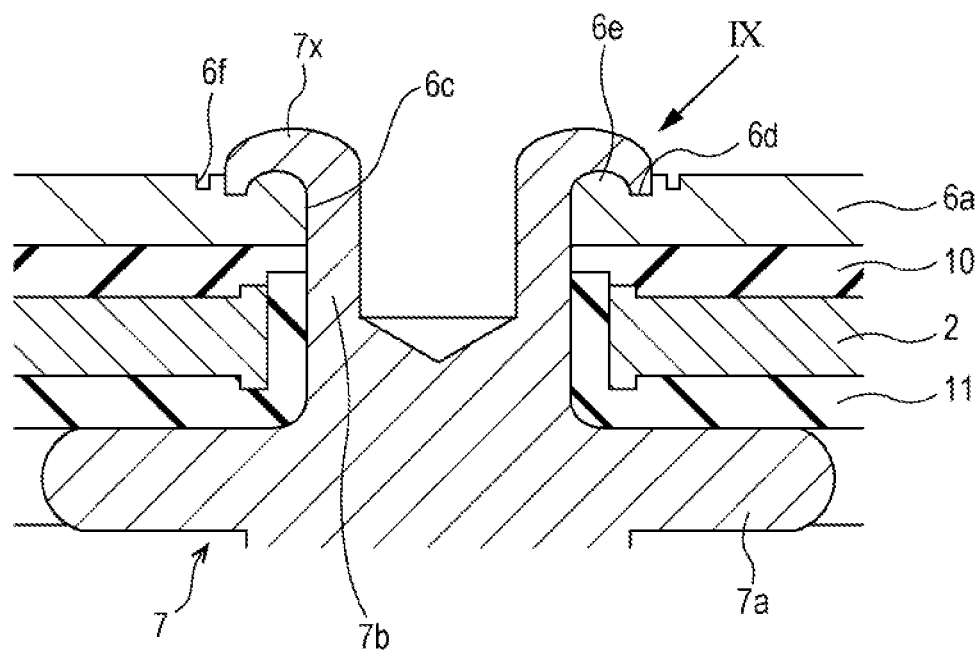
FIG. 8 is a sectional view illustrating a state after the positive electrode terminal has been riveted on the positive electrode current collector and is a sectional view of the vicinity of the positive electrode terminal taken along the longitudinal direction of the sealing plate.

FIG. 8 illustrates a cross section that corresponds to the cross section illustrated in FIG. 7 and is a sectional view illustrating a state after the inserting portion 7b of the positive electrode terminal 7 has been riveted.

FIG. 9A is an enlarged view of the vicinity of an area IX in FIG. 8 and is a diagram illustrating a state before a riveted portion 7x of the positive electrode terminal 7 and the base portion 6a of the positive electrode current collector 6 are laser-welded to each other.

Figure 9B:
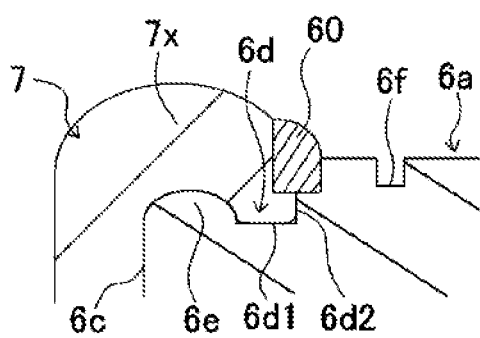

FIG. 9B is an enlarged view of the state of the vicinity of the area IX in FIG. 8 and is a diagram illustrating a state after the riveted portion 7x of the positive electrode terminal 7 and the base portion 6a of the positive electrode current collector 6 have been laser-welded to each other.

As a result of forming the protrusion 6e on the bottom surface 6d1 of the spot-faced hole 6d of the base portion 6a, formation of a large gap between the riveted portion 7x of the positive electrode terminal 7 and the base portion 6a can be effectively suppressed. Therefore, the positive electrode terminal 7 and the base portion 6a are further strongly connected to each other. In addition, the riveted portion 7x of the positive electrode terminal 7 and the edge of the spot-faced hole 6d of the base portion 6a can be stably weld-connected to each other. Thus, the connection portion in which the positive electrode terminal 7 and the base portion 6a are connected to each other has a high reliability.

Figure 10:
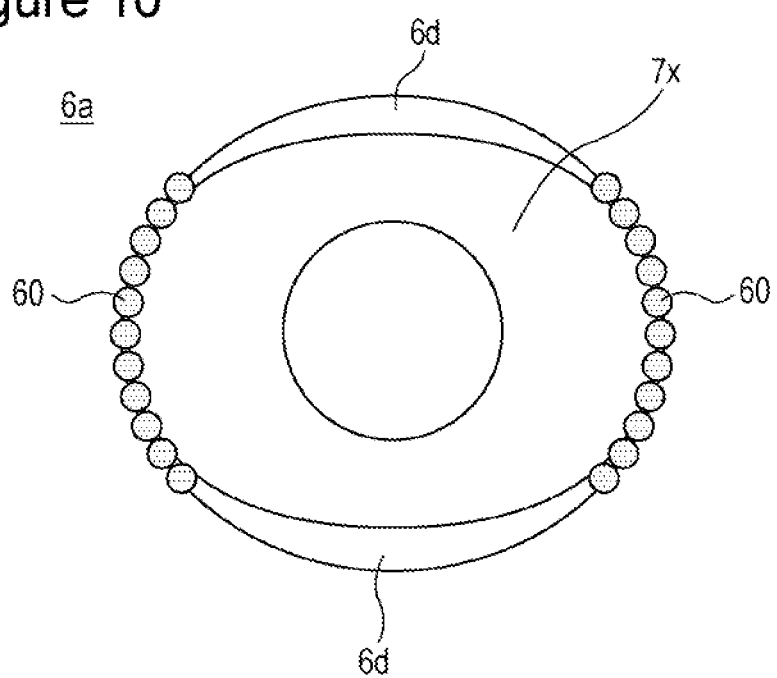
FIG. 10 is a plan view of the vicinity of a connection portion in which the positive electrode terminal and the positive electrode current collector are connected to each other and is a diagram illustrating a state after laser welding has been performed.

FIG. 10 is a diagram illustrating a state after the riveted portion 7x of the positive electrode terminal 7 and the base portion 6a of the positive electrode current collector 6 have been laser-welded to each other and is a plan view illustrating the riveted portion 7x of the positive electrode terminal 7 and the base portion 6a of the positive electrode current collector 6.

As illustrated in FIG. 10, the edge of the spot-faced hole 6d which is formed in the base portion 6a of the positive electrode current collector 6, and the riveted portion 7x of the positive electrode terminal 7 are weld-connected to each other, so that welded portions 60 are formed. Note that each of the welded portions 60 may be formed into a plurality of dots or may be formed into a linear shape. Alternatively, a single welded portion 60 having as ring-like shape may be formed. It is preferable that, when viewed in plan view, the protrusion 6e be located on a straight line that connects the center of the current-collector through hole 6c and the welded portions 60.

[First Modification]

Figure 11:
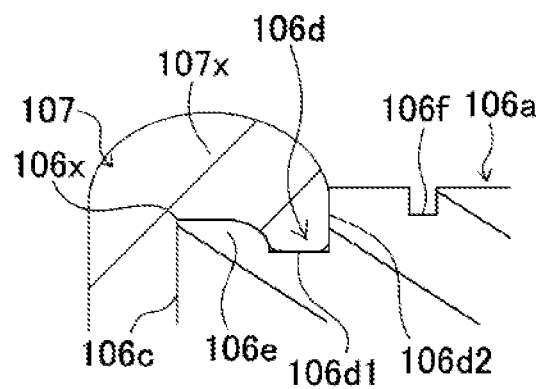
FIG. 11 is a sectional, view illustrating a positive electrode terminal and a positive electrode current collector according to a first modification and is a sectional view of the vicinity of a riveted portion of the positive electrode terminal.

FIG. 11 is an enlarged sectional view illustrating the vicinity of a connection portion in which a positive electrode terminal 107 and a base portion 106a of a positive electrode current collector are connected to each other in a quadrangular secondary battery according to a first modification. FIG. 11 is a sectional view that corresponds to FIG. 9A. FIG. 11 illustrates a state before a riveted portion 107x of the positive electrode terminal 107 and the base portion 106a of the positive electrode current collector are laser-welded to each other. In the first modification, the shape of a spot-faced hole 106d that is formed in the base portion 106a of the positive electrode current collector is different from the shape of the spot-faced hole 6d according to the above-described embodiment.

A current-collector through hole 106c is formed in the base portion 106a of the positive electrode current collector. The spot-faced hole 106d is formed around the current-collector through hole 106c. The spot-faced hole 106d has a bottom surface 106d1 and a side surface 106d2. A protrusion 106e is formed on the bottom surface 106d1 so as to extend around the current-collector through hole 106e. A groove 106f is formed around the spot-faced hole 106d.

The positive electrode terminal 107 is inserted into the current-collector through hole 106c, and an end portion of the positive electrode terminal 107 is riveted in the spot-faced hole 106d. The riveted portion 107x of the positive electrode terminal 107 covers the protrusion 106e and is in contact with the bottom surface 106d1 and the side surface 106d2. Since the protrusion 106e is formed, a large gap is less likely to be formed between the riveted portion 107x of the positive electrode terminal 107 and the base portion 106a.

In the positive electrode current collector according to the first modification, a corner 106x is formed at an edge of the current-collector through hole 106c. It is preferable that the radius of curvature of the corner 106x be 0.05 mm or smaller. As a result, the positive electrode terminal 107 is further strongly pressed into contact with the base portion 106a of the positive electrode current collector. Thus, the positive electrode terminal 107 and the base portion 106a of the positive electrode current collector are further strongly connected to each other. Note that it is preferable that the riveted portion 107x of the positive electrode terminal 107 and the edge of the spot-faced hole 106d be weld-connected to each other by using, for example, laser.

The inner side surface of the current-collector through hole 106c serves as a side surface of the protrusion 106e. An end portion of the protrusion 106e (an upper end portion of the protrusion 106e in FIG. 11) has a flat surface. The protrusion 106e is located at a position that is spaced apart from the side surface 106d2.

[Second Modification]

Figure 12:
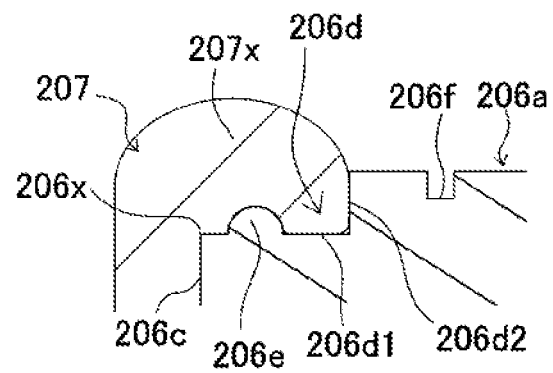
FIG. 12 is a sectional view illustrating a positive electrode terminal and a positive electrode current collector according to a second modification and is a sectional view of the vicinity of a riveted portion of the positive electrode terminal.

FIG. 12 is an enlarged sectional view illustrating the vicinity of a connection portion in which a positive electrode terminal 207 and a base portion 206a of a positive electrode current collector are connected to each other in a quadrangular secondary battery according to a second modification. FIG. 12 is a sectional view that corresponds to FIG. 9A. FIG. 12 illustrates a state before a riveted portion 207x of the positive electrode terminal 207 and the base portion 206a of the positive electrode current collector are laser-welded to each other. In the second modification, the shape of a spot-faced hole 206d that is formed in the base portion 206a of the positive electrode current collector is different from the shape of the spot-faced hole 206d according to the above-described embodiment.

A current-collector through hole 206c is formed in the base portion 206a of the positive electrode current collector. The spot-faced hole 206d is formed around the current-collector through hole 206c. The spot-faced hole 206d has a bottom surface 206d1 and a side surface 206d2. A protrusion 206e is formed on the bottom surface 206d1 so as to extend around the current-collector through hole 206c. The protrusion 206e has a curved surface portion. The protrusion 206e is located at a position that is spaced apart from the side surface 206d2. A groove 206f is formed around the spot-faced hole 206d.

The positive electrode terminal 207 is inserted into the current-collector through hole 206c, and an end portion of the positive electrode terminal 207 is riveted in the spot-faced hole 206d. The riveted portion 207x of the positive electrode terminal 207 covers the protrusion 206e and is in contact with the bottom surface 206d1 and the side surface 206d2. Since the protrusion 206e is formed, a large gap is less likely to be formed between the riveted portion 207x of the positive electrode terminal 207 and the base portion 206a.

In the positive electrode current collector according to the second modification, the protrusion 206e is formed at a position that is spaced apart from an edge of the current-collector through hole 206c. In addition, a corner 206x is formed at the edge of the current-collector through hole 206c. It is preferable that the radius of curvature of the corner 206x be 0.05 mm or smaller. As a result, the positive electrode terminal 207 is further strongly pressed into contact with the base portion 206a of the positive electrode current collector. Thus, the positive electrode terminal 207 and the base portion 206a of the positive electrode current collector are further strongly connected to each other. Note that it is preferable that the riveted portion 207x of the positive electrode terminal 207 and the edge of the spot-faced hole 206d be weld-connected to each other by using, for example, laser.

[Third Modification]

Figure 13:
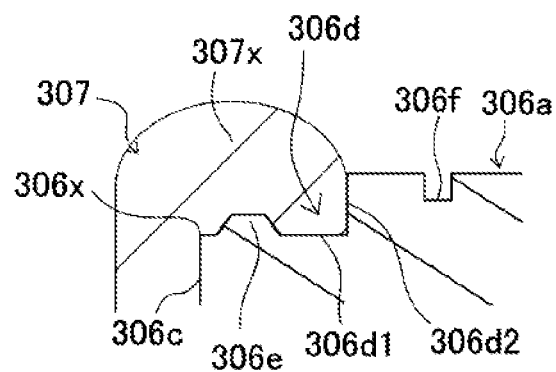
FIG. 13 is a sectional view illustrating a positive electrode terminal and a positive electrode current collector according to a third modification and is a sectional view of the vicinity of a riveted portion of the positive electrode terminal.

FIG. 13 is an enlarged sectional view illustrating the vicinity of a connection portion in which a positive electrode terminal 307 and a base portion 306a of a positive electrode current collector are connected to each other in a quadrangular secondary battery according to a third modification. FIG. 13 is a sectional view that corresponds to FIG. 9A. FIG. 13 illustrates a state before a riveted portion 307x of the positive electrode terminal 307 and the base portion 306a of the positive electrode current collector are laser-welded to each other. In the third modification, the shape of a spot-faced hole 306d that is formed in the base portion 306a of the positive electrode current collector is different from the shape of the spot-faced hole 306d according to the above-described embodiment.

A current-collector through hole 306c is formed in the base portion 306a of the positive electrode current collector. The spot-faced hole 306d is formed around the current-collector through hole 306c. The spot-faced hole 306d has a bottom surface 306d1 and a side surface 306d2. A protrusion 306e is formed on the bottom surface 306d1 so as to extend around the current-collector through hole 306c. An end portion of the protrusion protrusion 306e (an upper end portion of the protrusion protrusion 306e in FIG. 13) has a flat surface. The protrusion 306e is located at a position that is spaced apart from the side surface 306d2. A groove 306f is formed around the spot-faced hole 306d.

The positive electrode terminal 307 is inserted into the current-collector through hole 306c, and an end portion of the positive electrode terminal 307 is riveted in the spot-faced hole 306d. The riveted portion 307x of the positive electrode terminal 307 covers the protrusion 306e and is in contact with the bottom surface 306d1 and the side surface 306d2. Since the protrusion 306e is formed, a large gap is less likely to be formed between the riveted portion 307x of the positive electrode terminal 307 and the base portion 306a.

In the positive electrode current collector according to the third modification, the protrusion 306e is formed at a position that is spaced apart from an edge of the current-collector through hole 306c. In addition, a corner 306x is formed at the edge of the current-collector through hole 306c. It is preferable that the radius of curvature of the corner 306x be 0.05 mm or smaller. As a result, the positive electrode terminal 307 is further strongly pressed into contact with the base portion 306a of the positive electrode current collector. Thus, the positive electrode terminal 307 and the base portion 306a of the positive electrode current collector are further strongly connected to each other. Note that it is preferable that the riveted portion 307x of the positive electrode terminal 307 and the edge of the spot-faced hole 306d be weld-connected to each other by using, for example, laser.

[Fourth Modification]

Figure 14:
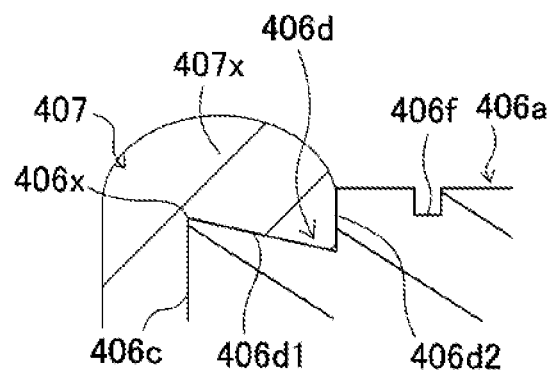
FIG. 14 is a sectional view illustrating a positive electrode terminal and a positive electrode current collector according to a fourth modification and is a sectional view of the vicinity of a riveted portion of the positive electrode terminal.
Figure 15:
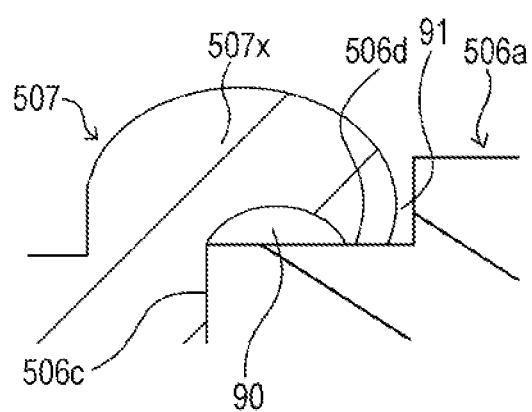
FIG. 15 is a sectional view illustrating a positive electrode terminal and a positive electrode current collector according to a reference example and is a sectional view of a riveted portion of the positive electrode terminal.

FIG. 14 is an enlarged sectional view illustrating the vicinity of a connection portion in which a positive electrode terminal 407 and a base portion 406a of a positive electrode current collector are connected to each other in a quadrangular secondary battery according to a fourth modification. FIG. 14 is a sectional view that corresponds to FIG. 9A. FIG. 14 illustrates a state before a riveted portion 407x of the positive electrode terminal 407 and the base portion 406a of the positive electrode current collector are laser-welded to each other. In the fourth modification, the shape of a spot-faced hole 406d that is formed in the base portion 406a of the positive electrode current collector is different from the shape of the spot-faced hole 406d according to the above-described embodiment.

A current-collector through hole 406c is formed in the base portion 406a of the positive electrode current collector. The spot-faced hole 406d is formed around the current-collector through hole 406c. The spot-faced hole 406d has a bottom surface 406d1 and a side surface 406d2. A groove 406f is formed around the spot-faced hole 406d.

The positive electrode terminal 407 is inserted into the current-collector through hole 406c, and an end portion of the positive electrode terminal 407 is riveted in the spot-faced hole 406d. The riveted portion 407x of the positive electrode terminal 407 is in contact with the bottom surface 406d1 and the side surface 406d2. The bottom surface 406d1 is inclined with respect to the radial direction of the current-collector through hole 406c (the transverse direction in FIG. 14) in such a manner that the depth of the spot-faced hole 406d gradually increases in a direction from the current-collector through hole 406c toward the side surface 406d2. Thus, a large gap is less likely to be formed between the riveted portion 407x of the positive electrode terminal 407 and the base portion 406a.

As illustrated in FIG. 14, it is preferable that the angle formed by the current-collector through hole 406c and the bottom surface 406d1 be 90 degrees or smaller. As a result, the positive electrode terminal 407 is further strongly pressed into contact with the base portion 406a of the positive electrode current collector. Thus, the positive electrode terminal 407 and the base portion 406a of the positive electrode current collector are further strongly connected to each other.

In the positive electrode current collector according to the fourth modification, a corner 406x is formed at an edge of the current-collector through hole 406c. It is preferable that the radius of curvature of the corner 406x be 0.05 mm or smaller. As a result, the positive electrode terminal 407 is further strongly pressed into contact with the base portion 406a of the positive electrode current collector. Thus, the positive electrode terminal 407 and the base portion 406a of the positive electrode current collector are further strongly connected to each other. Note that it is preferable that the riveted portion 407x of the positive electrode terminal 407 and the edge of the spot-faced hole 406d be weld-connected to each other by using, for example, laser.

[Others]

It is preferable that the shape of the current-collector through hole in plan view be an elliptical shape or a racetrack-like shape. In addition, it is preferable that the cross-sectional shape of the inserting portion of the terminal in a direction parallel to the sealing plate be similar to the shape of the current-collector through hole in plan view. As a result, rotation of the terminal with respect to the sealing plate can be suppressed. Note that the shape of the current-collector through hole in plan view may be a perfect circular shape.

It is preferable that the shape of the spot-faced hole in plan view be an elliptical shape or a racetrack-like shape. With such a configuration, as a result of the inserting portion of the terminal being riveted in the spot-faced hole, the terminal can be more reliably prevented from rotating with respect to the current collector. Note that the shape of the spot-faced hole in plan view may be a perfect circular shape.

Although the depth of the spot-faced hole is not limited, for example, the depth of the spot-faced hole is preferably 0.2 mm to 1.0 min, more preferably 0.2 mm to 0.5 min, and further preferably 0.2 mm to 0.4 mm.

In the radial direction of the current-collector through hole, the width of the spot-faced hole (the distance from the edge of the current-collector through hole to the side surface of the spot-faced hole) is preferably 0.5 mm to 3.0 mm, more preferably 0.5 mm to 2.0 mm, and further preferably 0.5 mm to 1.3 mm.

In the radial direction of the current-collector through hole, the width of the protrusion is preferably 0.3 mm to 2.0 mm, more preferably 0.5 mm to 1.5 mm, and further preferably 0.6 mm to 1.0 mm.

It is preferable that the height of the protrusion be smaller than the depth of the spot-faced hole. It is more preferable that the height of the protrusion be 0.1 times to 0.5 times the depth of the spot-faced hole.

The present invention disclosed herein is particularly effective in the case where a terminal is riveted and fixed onto a current collector by a single riveting operation.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
    an electrode body that includes a positive electrode plate and a negative electrode plate;
    an exterior body that has an opening and accommodates the electrode body;
    a sealing plate that has a terminal mounting hole and seals the opening;
    a current collector that is electrically connected to the positive electrode plate or the negative electrode plate; and
    a terminal that is connected to the current collector and inserted in the terminal mounting hole,
    wherein the current collector has a current-collector through hole,
    wherein a spot-faced hole is formed around the current-collector through hole,
    wherein the spot-faced hole has a bottom surface and a side surface, the side surface connects to an outer periphery of the bottom surface,
    wherein the terminal is inserted in the current-collector through hole and has a riveted portion which is bent outward from the current-collector through hole in a radial direction of the current-collector through hole,
    wherein the bottom surface is inclined with respect to the radial direction of the current-collector through hole in such a manner that a depth of the spot-faced hole gradually increases with an increasing distance from the current-collector through hole in the radial direction of the current-collector through hole,
    wherein a portion of the riveted portion is located nearer the sealing plate than a portion of the bottom surface in a thickness direction of the sealing plate,
    wherein the portion of the riveted portion is farther from the current-collector through hole than the portion of the bottom surface in the radial direction of the current-collector through hole,
    wherein the riveted portion of the terminal is weld-connected to the side surface an edge of the spot-faced hole,
    wherein in the thickness direction of the sealing plate, a dimension between a first end and a second end of the bottom surface is smaller than a dimension between a distal end of the side surface and the first end of the bottom surface,
    wherein in the thickness direction of the sealing plate, the first end of the bottom surface is located nearest to the sealing plate among portions of the bottom surface, and
    wherein in the thickness direction of the sealing plate, the second end of the bottom surface is located farthest from the sealing plate among the portions of the bottom surface.

2. The secondary battery according to claim 1, wherein an end of the riveted portion of the terminal is in contact with the side surface.

3. The secondary battery according to claim 1, wherein a corner at an edge of the current-collector through hole has a radius of curvature of 0.05 mm or smaller.

* * * * *